US012577885B2

(12) United States Patent
De Kler

(10) Patent No.: US 12,577,885 B2
(45) Date of Patent: Mar. 17, 2026

(54) OXYGEN-LED POWER GENERATING SYSTEM

(71) Applicant: FUST ENERGY B.V., Breda (NL)

(72) Inventor: Robert Christiaan Franciscus De Kler, Breda (NL)

(73) Assignee: HYAPC B.V., Maastricht (NL)

( * ) Notice: Subject to any disclaimer, the term of this patent is extended or adjusted under 35 U.S.C. 154(b) by 393 days.

(21) Appl. No.: 18/027,868

(22) PCT Filed: Sep. 23, 2021

(86) PCT No.: PCT/NL2021/050572
§ 371 (c)(1),
(2) Date: Mar. 22, 2023

(87) PCT Pub. No.: WO2022/066008
PCT Pub. Date: Mar. 31, 2022

(65) Prior Publication Data
US 2025/0270940 A1 Aug. 28, 2025

(30) Foreign Application Priority Data
Sep. 23, 2020 (NL) ...................................... 2026521

(51) Int. Cl.
F01D 15/10 (2006.01)
C25B 1/04 (2021.01)
(Continued)

(52) U.S. Cl.
CPC ............... F01D 15/10 (2013.01); F02C 3/34 (2013.01); C25B 1/04 (2013.01); F05D 2220/64 (2013.01);
(Continued)

(58) Field of Classification Search
CPC ... F01D 15/10; F02C 3/34; C25B 1/04; F05D 2220/64; F05D 2220/76; H02K 7/1823
See application file for complete search history.

(56) References Cited

U.S. PATENT DOCUMENTS

| | | | | |
|---|---|---|---|---|
| 3,459,953 A | * | 8/1969 | Brauser | ................. F01K 25/005 60/659 |
| 4,353,214 A | | 10/1982 | Gardner | |
| 4,434,613 A | * | 3/1984 | Stahl | .................... F25J 3/04127 60/39.182 |

FOREIGN PATENT DOCUMENTS

DE 102015226305 A1 6/2017

* cited by examiner

*Primary Examiner* — Joseph Ortega
(74) *Attorney, Agent, or Firm* — J.M. Robertson, LLC

(57) ABSTRACT

The invention relates to a power generating system for balancing services and electricity production, a method of modifying an existing power generating plant to provide balancing services and electricity production, the use of electrolysis for providing balancing services to an existing power generating plant, and a process for producing electricity. The power generating system comprises a compression section, a combustion section, and an expansion section, the compression section being in fluid communication with a combustion section, the combustion section being in fluid communication with an expansion section, wherein the power generating system is configured to flow a working medium in a closed-loop, wherein the power generating system is configured such that oxygen and a reductant power the power generating system to generate electricity, and wherein the power generating system is configured to provide electricity to i) an electricity grid, and ii) in an event of a surplus of electricity on the electricity grid, an electrolysis section,

34 Claims, 4 Drawing Sheets

(51) Int. Cl.
     *F02C 3/34*           (2006.01)
     *H02K 7/18*           (2006.01)
(52) U.S. Cl.
     CPC ........ *F05D 2220/76* (2013.01); *H02K 7/1823*
                               (2013.01)

OXYGEN-LED POWER GENERATING SYSTEM

The invention is in the field of electricity-generating technology and can be integrated in hydrogen grids and storage facilities making use of oxygen and particularly pertains to the production and storage of electricity. The invention relates to a power generating system for balancing services and for power production, and a process for producing electricity. The invention also relates to revamping an existing power generating plant, and the use of electrolysis for providing balancing services to an existing power generating plant.

The future of electric energy generation will be steadily more derived from renewable energy sources, in particular wind and solar. Due to the intermittency and stochastic behaviour of these renewable energy sources, a stable and safe utilisation of new renewable energy will become essential evermore. Also, there is a need for an electricity balancing system between electricity generation and ultimate electricity consumption. This need holds for any electricity system regardless of the composition of its electricity generating park. However, due to the intermittent and stochastic behaviour of renewable electricity generating systems, the requirements for balancing are getting more severe at increasing contribution of renewable electricity generation to the total electricity generation.

The current state of the art for power generation and electricity grid balancing possibilities include the following systems.

State-of-the-art designed and constructed power generation and balancing using fossil fuel and/or nuclear power stations. These power stations emit gases such as carbon dioxide and nitrogen oxides (NOx) into the atmosphere. Both gases are examples that are harmful to the environment and lead to climate change. In addition, conventional power generation show relatively low thermal efficiency.

Balancing using pumped-storage units. Pumped-storage requires a lot of plot space and has a limitation in terms of applicability. In particular, in flat areas near sea level, deployment of pumped storage units is not feasible, let alone possible. Globally, the potential capacity of pumped storage alone is insufficient for the realisation of a healthy balancing system in cases where renewable electricity generation becomes a major contributor to total electricity generation.

Balancing using air storage systems in underground spaces. Similar to pumped storage, the balancing air storage system is location-depended. In addition, direct air emission in case of combustion with fuel gas will lead to nitrogen oxides and carbon dioxide emissions. Moreover, such systems show a relatively low cycle efficiency.

Balancing through large-scale use of batteries. State-of-the-art in large scale batteries are lithium-ion and sodium-sulphur batteries. Both have relatively high power and energy densities, high part-load efficiencies and feature fast load-following. Disadvantages of the balancing system are high production costs, safety risks, and the fact that there is barely no support for seasonal storage of energy. Currently, power grid smoothing is the only application for batteries, which is not fulfilling the requirements for a large-scale balancing system that must also be suitable for large seasonal variation in the generation of renewable electricity.

Balancing using flow batteries. Even though flow batteries feature high energy densities, they lack efficiency. The main application of flow batteries, and especially the vanadium redox flow batteries, is smaller-scale energy storage systems. Like lithium-ion and sodium-sulphur batteries, flow batteries are not suited for seasonal balancing of renewably generated electricity.

Power generation and balancing using electrochemical hydrogen production and later hydrogen combustion in power stations designed according to the state-of-the-art fossil fuel-fired power stations. The main disadvantage of hydrogen combustion with current gas-fired power plants is the direct air emission of NOx. Conventional power generation in current gas-fired power stations will show relatively low efficiencies in particular during part-load operations. Also, it must be kept in mind that a balancing system for an electricity generating park which mainly consists of renewable generation units will feature lowered mean load factors of the power station deployed for balancing.

Balancing using electrochemical hydrogen production and power generation using hydrogen combustion in fuel cells. State-of-the-art proton-exchange membrane (PEM) fuel cells exhibit high efficiencies, part-load situation and fast load-following response. These characteristics are favourable for balancing purposes. However, like with batteries, the limited scale of the technology is a major disadvantage.

Power generation and balancing using an argon power cycle (APC) system. For example, WO-A-2016/019357 relates to such a recirculating energy system. The system uses a positive displacement engine, or a combustion engine, alike an Otto-engine in which hydrogen is ignited. A drawback of this system is that it is based on positive displacement engines. These engines are not suitable for the construction of large-scale power stations that are suited for seasonal electricity grid balancing. Moreover, with Otto-engines, part-load efficiency declines when the load is reduced.

U.S. Pat. No. 3,459,953 discloses an energy storage system.

U.S. Pat. No. 4,353,214 discloses a balancing method based on air storage systems.

U.S. Pat. No. 4,434,613 discloses an apparatus comprising a gas turbine for producing carbon dioxide. The apparatus is not for balancing services.

DE-A-10 2015 226 305 discloses a gas turbine system. The system is not for balancing services.

The invention relates to an innovative system that is ideally suited for electricity production and electricity balancing, including seasonal balancing, needed for an electricity generation park, such as an electricity generation park with a large contribution of renewable generated electricity. In particular, the invention relates to the use of water electrolysis to enable revolutionary power station cycles.

An objective of the invention is to address one or more of the disadvantages faced in the prior art. It is a further objective of the invention to provide a power generating and balancing system that avoids the emission of harmful gases during balancing and power generation. Further objectives include an increase of part-load efficiency and fast load following. A particular objective is to provide a balancing system that is suitable for large-scale and seasonal balancing.

The inventors found that one or more of these objectives can be met, at least in part, with the invention as described in this disclosure.

Accordingly, in a first aspect of the invention there is provided a power generating system for balancing services and electricity production, comprising a compression section, a combustion section, and an expansion section, the compression section being in fluid communication with a combustion section, the combustion section being in fluid communication with an expansion section, wherein the power generating system is configured to flow a working medium in a closed-loop, wherein the power generating system is configured such that oxygen and a reductant power the power generating system to generate electricity, and wherein the power generating system is configured to provide electricity to i) an electricity grid, and ii) in an event of a surplus of electricity on the electricity grid, an electrolysis section, wherein the electrolysis section is configured to produce oxygen and hydrogen.

In a further aspect, there is provided a method of modifying an existing power generating plant to provide balancing services and electricity production, preferably an existing gas turbine power plant, the plant comprising a compression section, a combustion section, and an expansion section, the compression section being in fluid communication with a combustion section, the combustion section being in fluid communication with an expansion section, the plant being configured such that oxygen and a reductant power the plant to generate electricity, and the plant being configured to provide electricity to an electricity grid, wherein the method comprises a step of configuring the plant to provide electricity in an event of a surplus of electricity on the electricity grid to an electrolysis section to produce oxygen and hydrogen.

In yet a further aspect, there is provided the use of electrolysis for providing balancing services to an existing power generating plant, preferably an existing gas turbine power plant, the plant comprising a compression section, a combustion section, and an expansion section, the compression section being in fluid communication with a combustion section, the combustion section being in fluid communication with an expansion section, wherein the plant is configured such that oxygen and a reductant power the plant to generate electricity, the plant being configured to provide electricity to an electricity grid, wherein in an event of a surplus of electricity on the electricity grid the plant is configured such that the plant provides electricity to an electrolysis section that is configured to produce oxygen and hydrogen.

In yet a further aspect, there is provided a process for producing electricity, comprising:

(a) a compression step, wherein oxygen and a working medium are compressed to form a compressed feed, preferably wherein the working medium is as defined in this disclosure;

(b) a combustion step, wherein the compressed feed is mixed with a reductant, and the mixture is combusted to form a combustion feed, preferably wherein the reductant is as defined in this disclosure, and (c) an expansion step, wherein the combustion feed is expanded and drives a turbine which powers a generator, thereby producing electricity for an electricity grid, wherein in the event of a surplus of electricity on the electricity grid the electricity is used in the following step:

(d) an electrolysis step, wherein water is electrolysed to produce hydrogen and oxygen.

In a general sense, the invention is based on the judicious insight to store energy that is generated on a large scale-in the event of potential overload of the electricity grid-in the form of oxygen. By including, for example, an electrolysis section (or electrolyser), as defined in this disclosure, in, e.g., a power generating process, surplus energy can be used to electrolyse water, thereby producing oxygen and hydrogen. Thus, the electrolysis section may be a water electrolysis section. In the event of a demand for electricity, the produced oxygen and hydrogen can be subsequently used to power a power generating process. Yet, the power generating process can be powered by oxygen and hydrogen originating from elsewhere.

When referring to a noun (e.g., a reductant, a generator, a turbine, etc.) in the singular, the plural is meant to be included, or it follows from the context that it should refer to the singular only.

The term "closed-loop" as used in this disclosure is meant to refer to a configuration so as to (re) circulate the working medium substantially without exchanging or discharging the working medium outside of the system. The system may comprise a closable container to hold a working medium. The term "closable container" as used in this disclosure is meant to refer to an object for holding and/or transporting something, such as, for example, a conduit, container, (closed-) loop, vessel, cylinder, etc. The term "closed-loop" as used in this disclosure is meant to include "substantially closed-loop" and "semi closed-loop" since the system allows for exchange, discharge and introduction of different kinds of feeds. For example, in the system, the outlet feed of the combustion section may not be exhausted into the ambient (atmosphere). With the closed-loop system as defined in this disclosure, the exhaust gases are processed to separate the working fluid from combustion products and by-products. A part of the working fluid may be lost from the system. The separated working fluid is at least in part recirculated within the system.

The term "fluid communication" as used in this disclosure is meant to refer to any connection between a first part or section of a plant, such as a compression section, and a second part or section of the plant, such as a combustion section, via which fluids, notably gases, can flow from the first part or section of the plant to the second part or section of the plant. The term does not necessarily imply a direct connection of a first part or section of a plant to a second part or section of the plant. For example, a third part or section of the plant, such as an expansion section, may be present between the first part or section of the plant and the second part or section of the plant, and thus may be in fluid communication with both the first and second parts or sections of the plant. Fluid communication is typically provided by piping systems, tubing, hoses, or other devices that are well-known to the skilled person for the transportation of fluids, if needed under vacuum or near vacuum, or above or below atmospheric pressures. When components are described as being coupled, connected, in communication, being in contact or contacting one another, they need not be physically directly touching one another unless specifically described as such.

The term "reductant" as used in this disclosure is meant to refer to one or more compounds that can lose an electron to an electron acceptor, such as an oxidant as defined in this disclosure. The reductant acts as a fuel for combustion. The reductant as used in this disclosure may comprise hydrogen and/or any compound with formula $C_xH_yO_z$, wherein x, y and z are integers. In particular, x is at least 1, y is 0 or higher, and z is 0 or higher. In an embodiment, $x \geq 1$; $0 < y \leq (2x+2)$ and $0 \leq z \leq 2x$. Preferably, the reductant comprises hydrogen or the compound with formula $C_xH_yO_z$ being methane.

The term "surplus" as used in this disclosure is meant to refer a situation wherein a capacity falls short for something that is in surplus. For example, a surplus of electricity on an electricity grid indicates a capacity shortage for electricity on the grid. On the other hand, the phrase "demand for electricity" refers to a shortage of electricity on, for example, an electricity grid.

The term "working medium" as used in this disclosure is meant to refer to a fluid medium that is used to, for example, dilute the oxidant and/or act as a shielding gas in, for example, a combustion section, and preferably to provide thermodynamic advantages. The fluid medium is preferably an inert medium. The working medium may be selected from helium, neon, argon, krypton, xenon, and radon, and/or other gases, such as carbon dioxide. The working medium may comprise one or more monoatomic gases, including helium and argon and/or carbon dioxide. Preferably, the working medium comprises argon.

Using a working medium that comprises argon can provide several advantages. Argon can act as a shielding gas to protect materials, such as metals, from oxidation during, for example, welding of ferrous or non-ferrous alloys. The shielding of materials by, for example, using argon, is desirable in case of, for example, the combustion of hydrogen. Thus, argon may be used as a shielding gas, for example, in a combustion section, such as described in this disclosure. Argon can further prevent stickiness of hydrogen in combustors and on burner materials. As such no derating of combustion temperature may be required, and high conversion efficiencies can be reached. Argon shielding can be applied to combustors and/or burners, which may require minor modifications. Another advantage of using argon is its sealing capability to minimise inventory losses, which can be desirable for a closed-loop configuration.

The invention is applicable to both the construction of, for example, new power generating plants ("grass root" plants) as well as in revamping existing plants.

The invention provides a closed-loop power generating system for balancing services and electricity production. The system comprises a compression section, the compression section being in fluid communication with a combustion section, the combustion section being in fluid communication with an expansion section. Thus, the system comprises the aforementioned sections. The power generating system is configured such that a working medium can flow through it in a closed-loop. Since the system is for balancing services and power generation, it is configured such that it generates and can provide electricity to, for example, an electricity grid and an electrolysis section. The power generating system is configured such that oxygen and a reductant power the system to generate electricity. The system may generate and provide electricity in case of a power shortage. In the event of a surplus of electricity on, for example, the electricity grid, the power generating system provides electricity to an electrolysis section that is configured to produce oxygen and hydrogen. In particular, renewable energy will power an electrolysis section that produces oxygen and hydrogen in the event of a surplus of electricity. On the other hand, in the event of demand for electricity on, for example, the electricity grid, oxygen and/or a reductant, such as the oxygen and hydrogen produced with the electrolysis section, may power the power generating system. In the case of a surplus of electricity, power generation is preferably switched-off, and renewable electricity may power the electrolysis section to produce oxygen and hydrogen. The system may further comprise the electrolysis section. The produced oxygen and/or hydrogen may be stored for future use. In the event of demand for electricity, oxygen and a reductant, for example, the stored oxygen and a reductant or the stored oxygen and the stored hydrogen, may power the power generating system.

Figure 1:
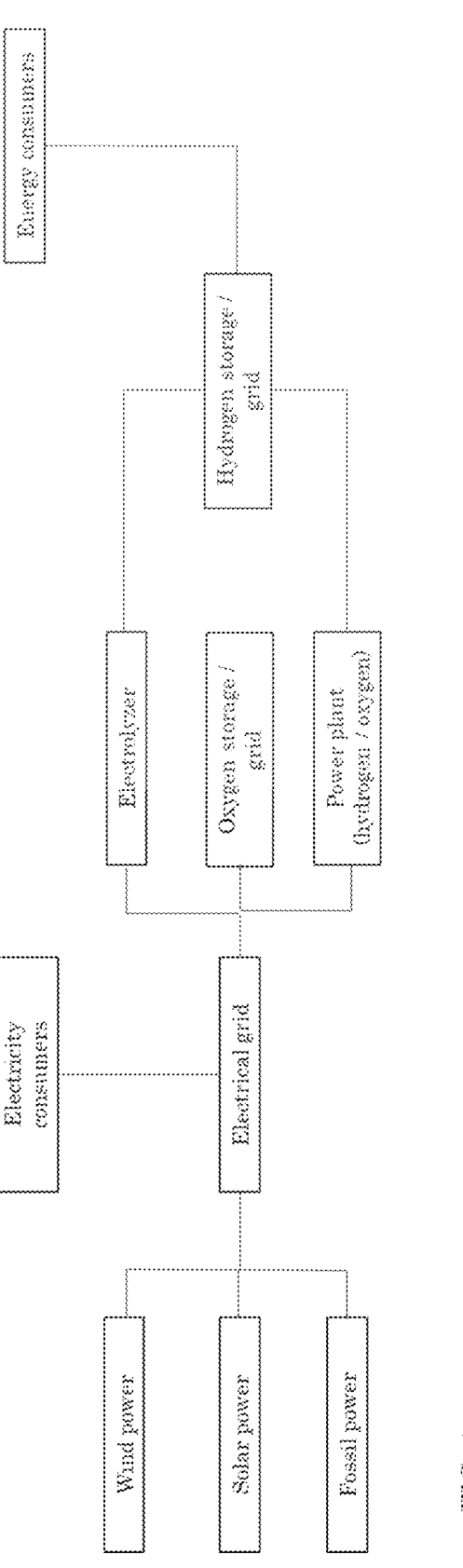
FIG. 1 is a schematic diagram illustrating general features of a power generating system as defined in the present disclosure.

DETAILED DESCRIPTION:

FIG. 1 shows a schematic of a principle behind the power generating system. As shown, various energy sources, including wind farms, solar and farms, fossil fuel-powered power plants, provide energy to the AC electric grid. The consumer demand is addressed with the energy in the grid, and excess energy may go to an electrolyser to produce hydrogen and oxygen, which may be stored. When consumer demand on the grid exceeds the output of the primary energy sources, the stored hydrogen and oxygen may be used in the power generating system, which utilises the technology disclosed in this disclosure, to efficiently convert stored oxygen and hydrogen into energy usable by consumers.

The electrolysis section as defined in this disclosure, may comprise a device that uses electricity to split water into hydrogen and oxygen (i.e., electrolysis of water), such as an electrolyser. The hydrogen and oxygen produced with electrolysing water may be used for different applications. In particular, the oxygen is stored and used in times of demand for electricity. The section may comprise an electrolyser, and is preferably configured to electrolyse water, thereby producing oxygen and hydrogen.

In the compression section, the oxidant may be compressed with the working fluid before the mixture is fed into the combustion section. Hence, the compression section may be configured to compress the oxidant and the working medium. The compression section may, therefore, comprise a means of compressing. For example, the compression section may comprise one or more compressors, particularly one or more turbo-compressors. The turbo-compressor compresses fluid through transferring mechanical power to the fluid with the help of a rotating impeller, resulting in a pressure increase. Upon processing of the exhaust gas to separate the working fluid from products and by-products, the recovered working fluid is fed into the compression section. In particular, the oxidant used in the compression section comprises oxygen, such as oxygen produced by the electrolysis section, as defined in this disclosure, or oxygen obtained from another source, like an oxygen grid, oxygen storage, etc. Air is preferably excluded as oxidant. This is because when air is used as a combustion agent for, for example, hydrogen, the flue gas may comprise water which is diluted with nitrogen. Part of the nitrogen may oxidise to form toxic nitrogen oxide species (NOx). On the other hand, essentially pure oxygen is neither preferred as oxidant. That is because, for example, flue gas production per mass unit of combusted hydrogen will be very low, leading to extremely high flame temperatures that may be too high for technical equipment. Hence, an oxidant, such as oxygen, is preferably diluted with the working medium, as defined in this disclosure.

The compression section may be fed with working fluid and oxidant. The volume by volume percentage of the oxidant may be at least 0.01%. The volume/volume percentage may be 0.5% or more, such as 3% or more, 5% or more, 6% or more, or 8% or more. The volume/volume percentage may be 9% or less, such as 7% or less, 4% or less, 2% or less, or 1% or less. In particular, the volume/volume percentage can be 0.01-9%, such as 0.01-2% or 1-6%. Preferably, the compression section is fed with working fluid and oxidant in a volume/volume percentage of 0.01-4%, such as 3-4% or 0.01-1%.

The working fluid and oxidant may be compressed at a pressure of at least 10 bar (a), such as 15 (a) bar or more or 20 bar (a) or more. In particular, the working fluid and oxidant are compressed at a pressure of 20-55 bar (a), such as 25-45 bar (a) or 35-40 bar (a).

The working fluid and oxidant may be compressed at a temperature of at least 200° C., such as 250° C. or more or 300° C. or more. In particular, the working fluid and oxidant are compressed at a temperature of 300-400° C., such as 350-370° C.

The compressed working medium and oxidant are fed into the combustion section. The combustion section may comprise one or more combustors having an inlet for feeding reductant. The reductant may be (directly) injected into a combustion chamber. The reductant and/or oxygen may be stored separately in high or low-pressure storage units before brought together in the combustion section. The combustion section is configured to combust oxidant and reductant. The combustion section may comprise a shielding gas, such as described in this disclosure. The shielding gas may provide protection to components of the combustion section, such as combustors and burners, in particular in the case of hydrogen combustion. The shielding gas may have the same, a similar or a different composition to the working medium. The shielding gas may comprise one or more gases as described in this disclosure, in particular any gas the working medium can be comprised of. Preferably, the shielding gas comprises a monoatomic gas, such as argon.

In an embodiment, the combustion section is configured to run on a reductant as a fuel, such as hydrogen and/or methane (and/or any compound characterised with a chemical formula of $C_xH_yO_z$), and oxygen as an oxidant. The combustion section may comprise a shielding gas as defined in this disclosure, such as a shielding gas comprising argon. In particular, the combustion section is configured to combust oxygen and reductant. The reductant preferably comprises hydrogen and/or methane. The hydrogen may originate from the electrolysis section and/or other (commercial) sources. In order to ensure combustion of the desired amount of reductant and oxidant, an excess of either may be provided. In particular, the volume ratio between oxidant and reductant is slightly under stoichiometric conditions ($\lambda=1.0$ is at stoichiometry). $\lambda$ represents the oxidant-fuel equivalence ratio. The mixture comprising reductant and oxidant may be considered a rich mixture, i.e., $\lambda<1.0$. Preferably, the volume ratio is $\lambda=0.98$, because of optimal system performance.

After combustion, the outlet feed enters an expansion section. The expansion section may be configured to inter alia produce and distribute electricity to the electrolysis section. The expansion section may, therefore, comprise a means of converting thermal energy from the combustion gases to electricity, possibly via mechanical energy. For example, the expansion section may comprise one or more turbo-expanders to convert thermal energy to mechanical energy and one or more generators to generate electricity. The turbo-expander is a flow turbine, through which a pressurised gas, such as a combustion gas, is expanded to produce work to, for example, drive a compressor or generator. The thermal energy from combustion gases may be further "extracted" and may be used as a heat supply for, e.g., a steam reforming process, or for other purposes, such as heating one or more different sections of the system.

The exhaust stream of the expansion section may still have a high temperature. By collecting the thermal energy, for example, to heat a different section of the system, the energy efficiency of the overall system can be improved. The system may further comprise a heat recuperation section downstream of the expansion section. The heat recuperation section may be in fluid communication with the expansion section. The heat recuperation section may be in thermal communication with, for example, the outlet feed of the compression section and the inlet feed of the combustion section. Preferably, the heat recuperation section is configured to exchange heat between an outlet feed of the expansion section and an outlet feed of the compression section. The heat recuperation section may comprise a heat recovery steam generator (HRSG).

The power generating system may further comprise a separation section downstream of the expansion section. The separation section may be in fluid communication with the compression section. The separation section may comprise a means configured to separate components in the outlet feed from the expansion section. For example, water and/or carbon dioxide may be separated from the working medium. The separation section may comprise a condenser that may be configured to remove by-products of combustion and (dissolved) trace contaminant gases, such as carbon dioxide and/or nitrogen oxides. In the case of oxygen as the oxidant and hydrogen and/or a compound with formula $C_xH_yO_z$, such as methane, as the reductant, water is included as a by-product and may be condensed within the condenser. The separation section may comprise a gas separator, such as a carbon dioxide separator, that may constitute of membrane barriers. In particular, the separation section is configured to separate at least water and/or carbon dioxide from the working medium-depending on the combination of oxidant and reductant. The water collectable from the separation section may be suitable for potable use.

In an embodiment, the power generating system as defined in this disclosure, in particular the system of the invention, further comprises a separation section that comprises a condenser and a gas separator, in particular a separator for removal of carbon dioxide.

The power generating system may suitably be configured such that the ratio of the feeds, such as oxidant, reductant and/or working medium, is controllable. In particular, the ratio of working medium and oxidant may be controlled. Therefore, the system may be configured such that inventory control can be applied, for example to oxidant, reductant and/or working medium, particularly with respect to the working medium. The ability to apply inventory control, such as controlling the amount of working medium in the system, is advantageous. By controlling the amount of working medium, the pressure levels in the system can be influenced. In case the system comprises turbo-compressors and/or turbo-expanders, the alteration of inventory of working medium may change the power load without significantly influencing the turbo-compressor to turbo-expander ratio, the combustion chamber temperature and/or other operation temperatures. Hence, it is likely that the part-load efficiency will not significantly change upon load change. A decrease in efficiency due to load reduction when compared to, for example, argon power cycle systems, will not likely take place. The sliding pressure control, as described allows stable operation at deep power loads (see Table 1). The sliding pressure control avoids thermal stresses in the equipment. Therefore, fast, flexible load following behaviour is possible, which is advantageous for balancing systems.

TABLE 1

| Power load in relation to efficiency. | | | |
|---|---|---|---|
| | nominal load | 60% load | 30% load |
| Heat input (LHV) (MWth) | 763 | 433 | 249 |
| Power output (GT) (MW) | 312 | 177 | 102 |
| Power out (ST) (MW) | 166 | 94 | 54 |
| Power output (MW) | 478 | 271 | 156 |
| Efficiency (LHV) (%) | 63 | 63 | 63 |

Integration of a closed-loop power cycle comprising an expansion power generator and a closed-loop power cycle comprising the further cooling of working medium from the expansion section in a closed-loop steam power generating system enables high energy efficiency at different operational load. As can be seen from Table 1, high-level results of thermodynamic analysis of both cycles at different loads are observed.

Figure 2:
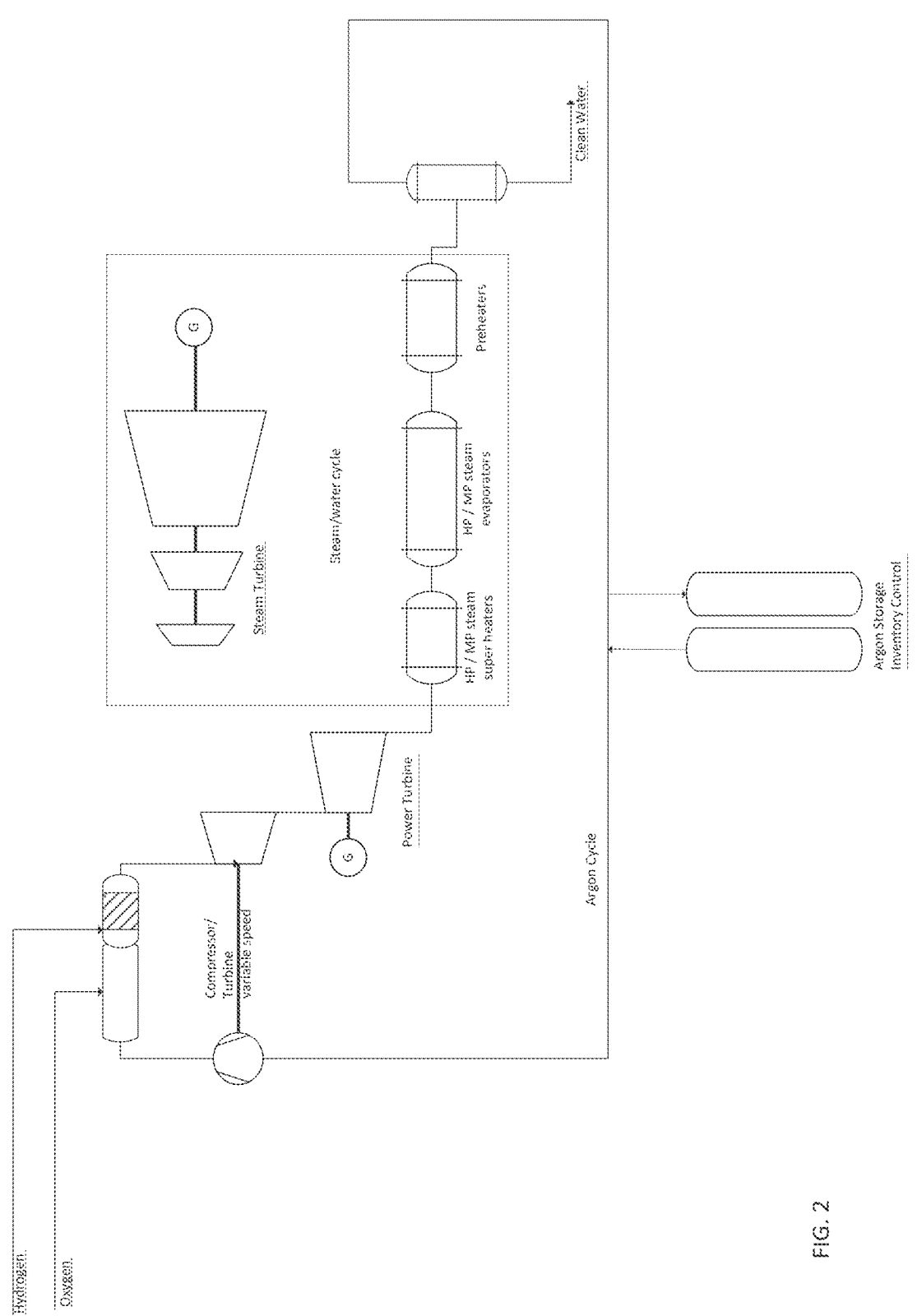
FIG. 2 is a schematic diagram illustrating features of a power generating system as defined in the present disclosure wherein the power generating system generates power by combusting oxygen and hydrogen.
Figure 3:
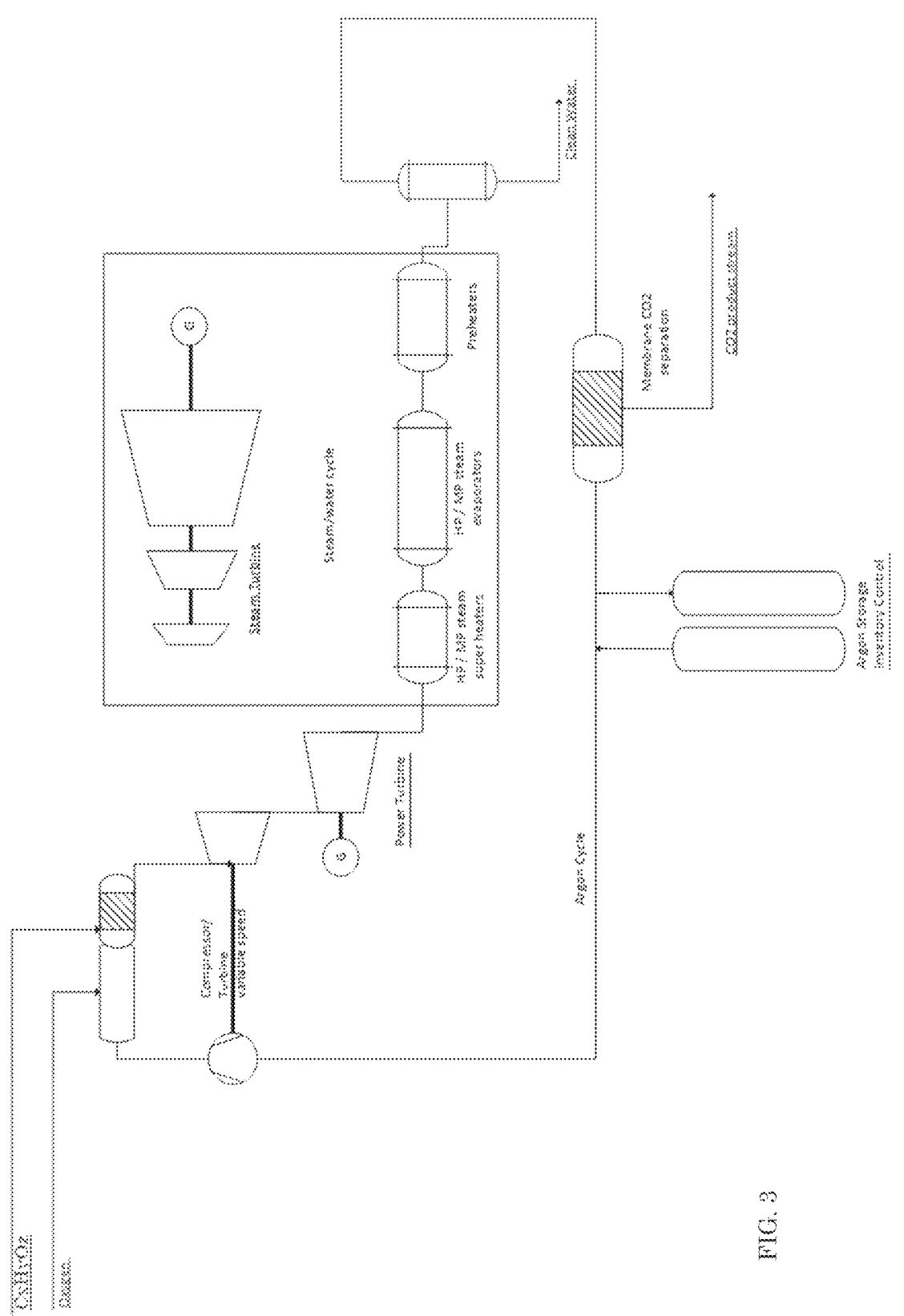
FIG. 3 is a schematic diagram illustrating features of a power generating system as defined in the present disclosure wherein the power generating system generates power by combusting oxygen and methane.

FIGS. 2 and 3 show a schematic overview of a power generating system as defined in this disclosure. In FIG. 2, the power generating system generates power by combusting oxygen and hydrogen, whereas in FIG. 3 the system generates power by combusting oxygen and methane. Oxygen is diluted with a working medium and is used as a combusting agent in a gas turbine diffusion burner for hydrogen. No piston-driven combustion engines are used. Instead, turbo-compressors and turbo-expanders are used, which are rotating equipment that is commonly used in large-scale power stations. While the working medium is depicted as argon, it is not restricted to this compound. After combustion, the working medium flows through an expansion power generator and is further cooled in a second (closed) steam power generating loop. The still high-temperature flue gas from the expansion power generator exchanges heat with the steam power generating system and is deeply cooled without additional cooling steps prior to compression. The integration of both (closed) loops, or power station cycles, enables high energy efficiency at different operational load.

Figure 4:
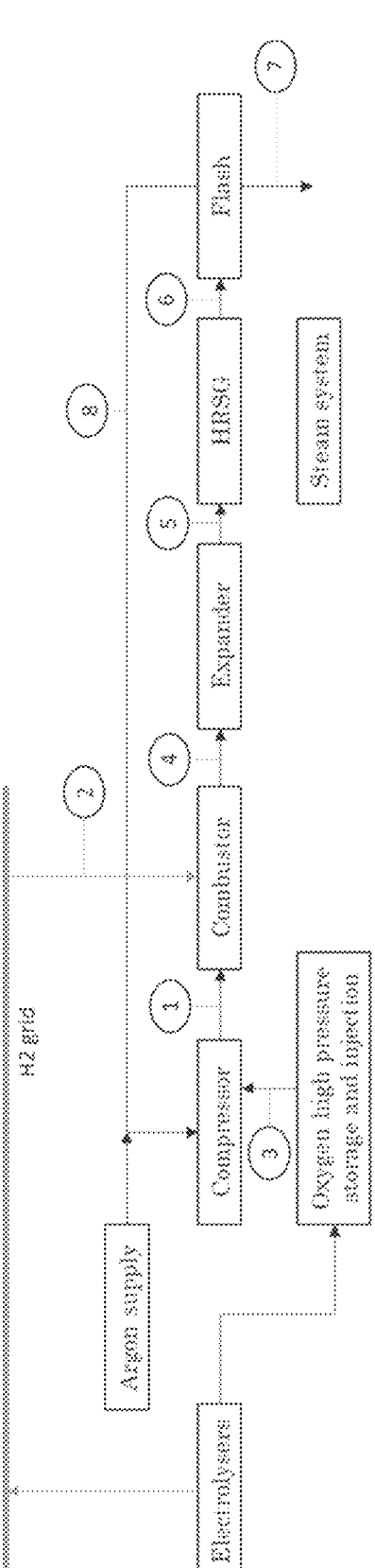
FIG. 4 is a flow diagram illustrating the use of argon as a working medium in a power generating system as defined in this disclosure.

The power generation is flexible and can be switched-on at any time. The system may comprise what is called a closed-loop Brayton cycle. In particular, the use of argon as a working medium has significant thermodynamic advantages compared to air or any other diatomic gas as a working medium. Tables 2 and 3 illustrate this, together with FIG. 4.

TABLE 2

| Heat and mass balance, including thermal efficiencies. | | | | | | | | |
|---|---|---|---|---|---|---|---|---|
| | 1 | 2 | 3 | 4 | 5 | 6 | 7 | 8 |
| Flowrate (kg/s) | 1140 | 7 | 60 | 1146 | 1146 | 1146 | 55 | 1091 |
| Pressure (bar(a)) | 35 | 40 | 35 | 34 | 5 | 5 | 5 | 5 |
| Temperature (° C.) | 371 | 20 | 30 | 1400 | 668 | 40 | 20 | 20 |
| Enthalpy (kJ/kg) | 205 | 140495 | 20 | 995 | 531 | 44 | 15 | 84 |
| $CH_4$ (%) | 0.00 | 0.00 | 0.00 | 0.00 | 0.00 | 0.00 | 0.00 | 0.00 |
| $C_2H_6$ (%) | 0.00 | 0.00 | 0.00 | 0.00 | 0.00 | 0.00 | 0.00 | 0.00 |
| $C_3H_8$ (%) | 0.00 | 0.00 | 0.00 | 0.00 | 0.00 | 0.00 | 0.00 | 0.00 |
| $i-C_4H_{10}$ (%) | 0.00 | 0.00 | 0.00 | 0.00 | 0.00 | 0.00 | 0.00 | 0.00 |
| $n-C_4H_{10}$ (%) | 0.00 | 0.00 | 0.00 | 0.00 | 0.00 | 0.00 | 0.00 | 0.00 |
| $n-C_5H_{12}$ (%) | 0.00 | 0.00 | 0.00 | 0.00 | 0.00 | 0.00 | 0.00 | 0.00 |
| $i-C_5H_{12}$ (%) | 0.00 | 0.00 | 0.00 | 0.00 | 0.00 | 0.00 | 0.00 | 0.00 |
| $neo-C_5H_{12}$ (%) | 0.00 | 0.00 | 0.00 | 0.00 | 0.00 | 0.00 | 0.00 | 0.00 |
| $C_6^+$ (%) | 0.00 | 0.00 | 0.00 | 0.00 | 0.00 | 0.00 | 0.00 | 0.00 |
| $C_2H_4$ (%) | 0.00 | 0.00 | 0.00 | 0.00 | 0.00 | 0.00 | 0.00 | 0.00 |
| $C_3H_6$ (%) | 0.00 | 0.00 | 0.00 | 0.00 | 0.00 | 0.00 | 0.00 | 0.00 |
| $CO_2$ (%) | 0.00 | 0.00 | 0.00 | 0.00 | 0.00 | 0.00 | 0.00 | 0.00 |
| $SO_2$ (%) | 0.00 | 0.00 | 0.00 | 0.00 | 0.00 | 0.00 | 0.00 | 0.00 |
| $O_2$ (%) | 8.33 | 0.00 | 100.00 | 2.73 | 2.73 | 3.04 | 0.00 | 3.04 |
| $N_2$ (%) | 0.00 | 0.10 | 0.00 | 0.01 | 0.01 | 0.01 | 0.00 | 0.01 |
| Ar (%) | 91.58 | 0.00 | 0.00 | 86.84 | 86.84 | 96.45 | 0.00 | 96.45 |
| He (%) | 0.00 | 0.00 | 0.00 | 0.00 | 0.00 | 0.00 | 0.00 | 0.00 |
| $H_2$ (%) | 0.00 | 99.90 | 0.00 | 0.00 | 0.00 | 0.00 | 0.00 | 0.00 |
| CO (%) | 0.00 | 0.00 | 0.00 | 0.00 | 0.00 | 0.00 | 0.00 | 0.00 |
| $H_2S$ (%) | 0.00 | 0.00 | 0.00 | 0.00 | 0.00 | 0.00 | 0.00 | 0.00 |
| COS (%) | 0.00 | 0.00 | 0.00 | 0.00 | 0.00 | 0.00 | 0.00 | 0.00 |
| $NH_3$ (%) | 0.00 | 0.00 | 0.00 | 0.00 | 0.00 | 0.00 | 0.00 | 0.00 |
| HCN (%) | 0.00 | 0.00 | 0.00 | 0.00 | 0.00 | 0.00 | 0.00 | 0.00 |
| $H_2O$ (%) | 0.09 | 0.00 | 0.00 | 10.41 | 10.41 | 0.50 | 100.0 | 0.50 |

TABLE 3

| Thermal efficiency. | |
| --- | --- |
| Heat input (LHV) (MWth) | 763 |
| Power output (GT) (MW) | 312 |
| Power out (ST) (MW) | 166 |
| Total power output (MW) | 478 |
| Efficiency (LHV) (%) | 63 |

The reason for its high efficiency is argon's high value for the isentropic exponent. As Tables 2 and 3 show in the heat and mass balance, thermal efficiencies up to 63% can be attained. Further optimisation may lead to even better efficiencies. The efficiencies are higher than can be obtained by current systems, such as the APC system. In the case of air as an oxidant, or nitrogen as the working medium in case of pure oxygen as an oxidant, there is a corrosion limitation in, for example, the HRSG. As such, heat recovery is temperature limited just above the condensation of water. Nitrogen oxides in the presence of water tend to form nitric acid. Also, the potential formation of nitrogen oxides will require a derating to the adiabatic flame temperature and or application of advanced premixed dry low nitrogen oxide burners (DLN). As a consequence, the efficiency (based on thermodynamic cycle calculations) will drop to below 57%. In the case of helium as the working medium, performance appears identical to that of argon (based on thermodynamic cycle calculations). However, the compression of helium is difficult due to small-sized monoatomic helium that diffuses through solids at a rate three times that of air. Accordingly, it is difficult to prevent leakages in the equipment. In the case of carbon dioxide as the working medium, the efficiency will be near 60%, based on thermodynamic cycle calculations The power generating system as defined in this disclosure may, in particular, be driven by turbines. Accordingly, the compression section may comprise one or more turbo-compressors and/or the expansion section may comprise one or more turbo-expanders. When designing the system such that turbines are present, preferably thereby excluding a piston-driven combustion engine, the inventors deem the system to be suitable for large-scale balancing services and power production. For example, it is considered that the system can be implemented at any size gas turbine, ranging from 5 MWe up to 300 MWe (megawatt electrical).

The invention also provides a method of modifying an existing power generating plant to provide balancing services and electricity production, preferably an existing gas turbine power plant. The plant comprises a compression section, the compression section being in fluid communication with a combustion section, the combustion section being in fluid communication with an expansion section. Thus, the plant comprises the aforementioned sections. The plant is configured such that oxygen and a reductant power the plant to generate electricity, and such that electricity can be provided to an electricity grid. The method comprises a step of configuring the plant to provide electricity to an electrolysis section as defined in this disclosure. The plant may further comprise the electrolysis section. In the event of a surplus of electricity on the electricity grid, the electricity that is generated by the plant is used to electrolyse water. In the event of demand for electricity, oxygen, such as the produced oxygen, and/or a reductant as defined in this disclosure, such as hydrogen, may be used to power the plant.

The method may further comprise a step of modifying the plant, wherein the modification is directed at the expansion section such that the section is configured to produce and distribute electricity to the electrolysis section.

With the method, the electrolysis section may comprise, as defined in this disclosure, one or more electrolysers. The electrolyser may be configured to provide oxygen for an inlet feed of the compression section and/or hydrogen for an inlet feed of the combustion section.

Further, with the method, the plant may be configured to flow the working medium in a closed-loop. Alternatively, if the existing plant is not already configured to flow working medium in a closed-loop, the method may further comprise a step of configuring the plant to allow the working medium to flow in a closed-loop. The working medium is preferably as defined in this disclosure.

The combustion section may be equipped with a shielding gas, such as a shielding gas as defined in this disclosure. The method may further comprise a step of adding a shielding gas to the combustion section.

The method may further comprise a step of adding to the plant a heat recuperation section downstream of the expansion section. The heat recuperation section may be placed such as to be in fluid communication with the expansion section. The heat recuperation section may be in thermal communication with, for example, the outlet feed of the compression section and the inlet feed of the combustion section. Preferably the heat recuperation section is configured to exchange heat between an outlet feed of the expansion section and an outlet feed of the compression section. The heat recuperation section may comprise a heat recovery steam generator (HRSG).

The method may additionally comprise the step of adding to the plant a separation section, as defined in this disclosure, placed downstream of the expansion section in case, for example, the existing plant does not comprise a separation section.

The invention further provides the use of electrolysis for providing balancing services to an existing power generating plant, preferably an existing gas turbine power plant. The plant comprises a compression section, the compression section being in fluid communication with a combustion section, the combustion section being in fluid communication with an expansion section. Thus, the plant comprises the aforementioned sections. The plant is configured such that oxygen and a reductant, such as described in this disclosure, power the plant to generate electricity, and such that electricity can be provided to an electricity grid. The plant is configured to provide electricity to an electrolysis section, as defined in this disclosure, to produce oxygen and hydrogen in the event of a surplus of electricity on, for example, the electricity grid. The plant may further comprise the electrolysis section. On the other hand, in the event of a demand for electricity, oxygen and a reductant as defined in this disclosure, such as the oxygen and hydrogen produced by the electrolysis section or oxygen produced by the electrolysis section and methane, may power the plant.

The existing power generating plant may be configured to flow the working medium in a closed-loop, as described in this disclosure. Preferably, the working medium is as defined in this disclosure.

The existing power generating plant may be further configured such that the combustion section comprises a shielding gas, such as defined in this disclosure.

The invention further provides a process for producing electricity. The process comprises a compression step (a), wherein oxygen and a working medium are compressed to form a compressed feed. Preferably, the working medium is as defined in this disclosure. In particular, the compression step is performed in a compression section as defined in this disclosure. The process further comprises a combustion step (b), wherein the compressed feed is mixed with a reductant and the mixture is combusted to form a combustion feed. The compressed feed may further be mixed with a shielding gas, such as defined in this disclosure. Preferably, the reductant is as defined in this disclosure. In particular, the combustion step is performed in a combustion section as defined in this disclosure, which may comprise a shielding gas. The process further comprises an expansion step (c), wherein the combustion feed is expanded and drives a turbine which powers a generator, thereby producing electricity for an electricity grid. The produced electricity may be fed to an electricity grid. In particular, the expansion step is performed in an expansion section as defined in this disclosure. In the event of a surplus of electricity on, for example, the electricity grid, the electricity produced with the expansion step is used in an electrolysis step (d), wherein water is electrolysed to produce hydrogen and oxygen.

Depending on the reductant, i.e., for example, when the reductant comprises hydrogen, renewable electricity can be produced with the process. If the reductant comprises hydrogen, a shielding gas, such as defined in this disclosure, may be used in the combustion step.

In the event of a demand for electricity on, for example, the electricity grid, the oxygen produced in step (d) may be used in step (a) and/or the hydrogen produced in step (d) may constitute the reductant in step (b).

The compression step of the process may be performed in a turbo-compressor. The expansion step may be performed in a turbo-expander. The process may be turbine-driven.

The process may further comprise a heat recuperating step, wherein thermal energy from outlet feed at step (c) is used to preheat the compressed feed.

The invention has been described by reference to various embodiments and methods. A skilled person understands that features of various embodiments and methods can be combined with each other.

All references cited in this disclosure are hereby completely incorporated by reference to the same extent as if each reference were individually and specifically indicated to be incorporated by reference and were set forth in its entirety in this disclosure.

The use of the terms "a" and "an" and "the" and similar referents in the context of describing the invention (especially in the context of the claims) are to be construed to cover both the singular and the plural unless otherwise indicated in this disclosure or clearly contradicted by context. The terms "comprising", "having", "including" and "containing" are to be construed as open-ended terms (i.e., meaning "including, but not limited to") unless otherwise noted. Recitation of ranges of values in this disclosure are merely intended to serve as a shorthand method of referring individually to each separate value falling within the range, unless otherwise indicated in this disclosure, and each separate value is incorporated into the specification as if it were individually recited in this disclosure. The use of any and all examples, or exemplary language (e.g., "such as") provided in this disclosure, is intended merely to better illuminate the invention and does not pose a limitation on the scope of the invention unless otherwise claimed. No language in the specification should be construed as indicating any non-claimed element as essential to the practice of the invention. For the purpose of the description and of the appended claims, except where otherwise indicated, all numbers expressing amounts, quantities, percentages, and so forth, are to be understood as being modified in all instances by the term "about". Also, all ranges include any combination of the maximum, and minimum points disclosed and include any intermediate ranges therein, which may or may not be specifically enumerated in this disclosure.

Preferred embodiments of this invention are described in this disclosure. Variation of those preferred embodiments may become apparent to those of ordinary skill in the art upon reading the foregoing description. The inventors expect skilled artisans to employ such variations as appropriate, and the inventors intend for the invention to be practised otherwise than as specifically described in this disclosure. Accordingly, this invention includes all modifications and equivalents of the subject-matter recited in the claims appended hereto as permitted by applicable law. Moreover, any combination of the above-described elements in all possible variations thereof is encompassed by the invention unless otherwise indicated in this disclosure or otherwise clearly contradicted by context. The claims are to be construed to include alternative embodiments to the extent permitted by the prior art.

For the purpose of clarity and a concise description, features are described in this disclosure as part of the same or separate embodiments; however, the scope of the invention may include embodiments having combinations of all or some of the features described.

The invention claimed is:

1. A power generating system for balancing services and electricity production, comprising: a compression section, a combustion section, and an expansion section, the compression section being in fluid communication with the combustion section, the combustion section being in fluid communication with the expansion section, wherein the power generating system is configured to flow a working medium in a closed-loop, wherein the power generating system is configured such that oxygen and a reductant power the power generating system to generate electricity, and wherein the power generating system is configured to provide electricity to i) an electricity grid, and ii) in an event of a surplus of electricity on the electricity grid, an electrolysis section, wherein the electrolysis section is configured to produce oxygen and hydrogen.

2. The power generating system according to claim 1, wherein the electrolysis section comprises an electrolyser configured to produce oxygen and hydrogen.

3. The power generating system according to claim 2, wherein the oxygen and/or hydrogen are fed into the power generating system for generating power.

4. The power generating system according to claim 1, further comprising a heat recuperation section downstream of the expansion section, the heat recuperation section being in fluid communication with the expansion section, wherein the heat recuperation section comprises a heat exchanger configured to exchange heat between an outlet feed of the expansion section and an outlet feed of the compression section.

5. The power generating system according to claim 4, wherein the heat recuperation section comprises a heat recovery steam generator.

6. The power generating system according to claim 1, wherein the working medium is an inert medium.

7. The power generating system according to claim 1, wherein the working medium comprises carbon dioxide.

8. The power generating system according to claim 1, wherein the working medium comprises one or more noble gases selected from the group consisting of helium, neon, argon, krypton, xenon, and radon.

9. The power generating system according to claim 1, wherein the working medium comprises argon.

10. The power generating system according to claim 1, wherein the combustion section comprises a combustor that is configured to combust oxygen and the reductant.

11. The power generating system according to claim 1, wherein the reductant comprises hydrogen.

12. The power generating system according to claim 1, wherein the reductant comprises a compound with formula $C_xH_yO_z$, wherein x, y and z are integers.

13. The power generating system according to claim 1, further comprising a separation section downstream of the expansion section, the separation section being in fluid communication with the compression section, wherein the separation section is capable of separating water and/or carbon dioxide from the working medium.

14. The power generating system according to claim 1, wherein the compression section comprises one or more turbo-compressors.

15. The power generating system according to claim 1, wherein the expansion section comprises one or more turbo-expanders.

16. The power generating system according to claim 1, being a turbine-driven power generating system.

17. The power generating system according to claim 1, wherein the power generating system is configured to control the working medium.

18. The power generating system according to claim 1, wherein the surplus of electricity is formed by a surplus of renewable energy.

19. The power generating system according to claim 1, wherein the combustion section comprises a shielding gas.

20. A method of modifying an existing gas turbine power plant or other power generating plant to provide balancing services and electricity production, the plant comprising a compression section, a combustion section, and an expansion section, the compression section being in fluid communication with the combustion section, the combustion section being in fluid communication with the expansion section, the plant being configured such that oxygen and a reductant power the plant to generate electricity, and the plant being configured to provide electricity to an electricity grid, wherein the method comprises a step of configuring the plant to provide electricity in an event of a surplus of electricity on the electricity grid to an electrolysis section to produce oxygen and hydrogen.

21. The method according to claim 20, wherein the electrolysis section comprises an electrolyser configured to provide oxygen for an inlet feed of the compression section and/or hydrogen for an inlet feed of the combustion section.

22. The method according to claim 20, wherein the plant is configured to flow a working medium in a closed-loop.

23. The method according to claim 22, wherein the working medium comprises one or more of the group consisting of helium, neon, argon, krypton, xenon and radon.

24. The method according to claim 20, wherein the method further comprises a step of configuring the plant to allow a working medium to flow in a closed-loop.

25. The method according to claim 20, wherein the combustion section comprises a combustor that is configured to combust oxygen and the reductant.

26. The method according to claim 20, wherein the reductant comprises hydrogen and/or a compound with formula $C_xH_yO_z$, wherein x, y and z are integers.

27. A method comprising use of electrolysis for providing balancing services to an existing gas turbine power plant or other existing power generating plant, the plant comprising a compression section, a combustion section, and an expansion section, the compression section being in fluid communication with the combustion section, the combustion section being in fluid communication with the expansion section, wherein the plant is configured such that oxygen and a reductant power the plant to generate electricity, the plant being configured to provide electricity to an electricity grid, wherein in an event of a surplus of electricity on the electricity grid the plant is capable of providing electricity to an electrolysis section producing oxygen and hydrogen.

28. The method according to claim 27, wherein the existing gas turbine power plant or other power generating plant is configured to flow a working medium in a closed-loop.

29. The method according to claim 28, wherein the working medium comprises one or more of the group consisting of helium, neon, argon, krypton, xenon and radon.

30. The method according to claim 27, wherein the combustion section comprises a combustor that is configured to combust oxygen and the reductant, wherein the reductant comprises hydrogen and/or a compound with formula $C_xH_yO_z$, wherein x, y and z are integers.

31. A process for producing electricity, comprising:
(a) a compression step, wherein oxygen and a working medium are compressed to form a compressed feed;
(b) a combustion step, wherein the compressed feed is mixed with a reductant, and the mixture is combusted to form a combustion feed, and
(c) an expansion step, wherein the combustion feed is expanded and drives a turbine which powers a generator, thereby producing electricity for an electricity grid, wherein in the event of a surplus of electricity on the electricity grid the electricity is used in the following step:
(d) an electrolysis step, wherein water is electrolysed to produce hydrogen and oxygen.

32. The process according to claim 31, wherein the compression step is performed in a turbo-compressor and/or the expansion step is performed in a turbo-expander.

33. The process according to claim 31, being a turbine-driven process.

34. The process according to claim 31 wherein the working medium comprises one or more of the group consisting of helium, neon, argon, krypton, xenon and radon.

\* \* \* \* \*